May 18, 1954 B. S. VILKOMERSON 2,678,970

DEVICE FOR CONTROLLING A STRAY MAGNETIC FLUX
IN MAGNETIC SOUND TRANSLATING DEVICES
Filed May 28, 1949

INVENTOR
BENJAMIN S. VILKOMERSON
BY Morris A. Rabkin
ATTORNEY

Patented May 18, 1954 2,678,970

UNITED STATES PATENT OFFICE 2,678,970

DEVICE FOR CONTROLLING A STRAY MAGNETIC FLUX IN MAGNETIC SOUND TRANSLATING DEVICES

Benjamin S. Vilkomerson, Camden, N. J., assignor to Radio Corporation of America, a corporation of Delaware Application May 28, 1949, Serial No. 96,094

3 Claims. (Cl. 179—100.2)

Figures 1, 2:
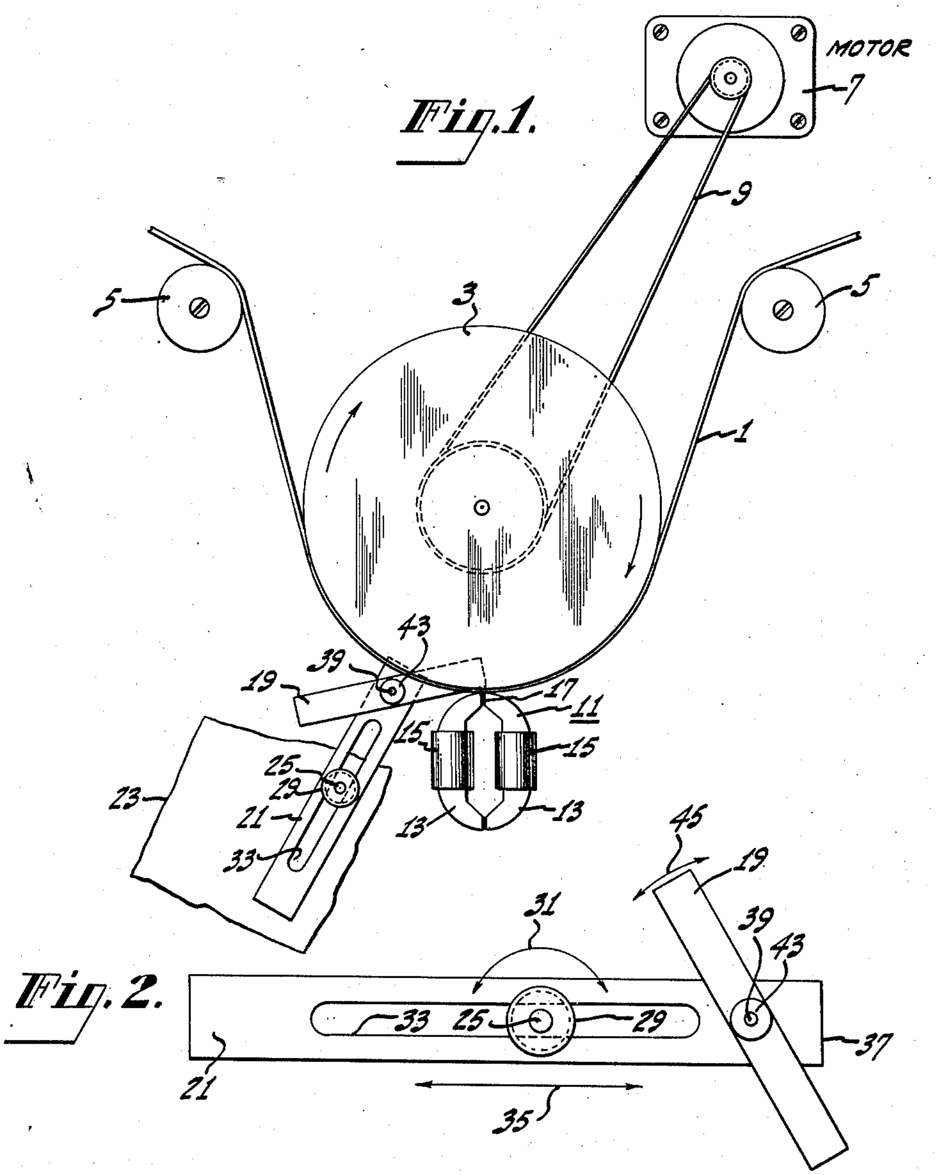

My present invention relates to magnetic sound translating devices, and more particularly to a device for preventing stray magnetic flux from adversely affecting the recording or reproduction of sound in magnetic sound translating devices.

Conventional magnetic sound translating devices are usually equipped with a magnetic head which consists, generally, of a magnetic core having a pair of pole pieces, the ends of which are separated to provide an air gap therebetween, and an induction coil disposed on each of the pole pieces. The magnetic head is designed to respond by induction to magnetic flux variations and may be employed either as a recording device for impressing a signal on a magnetic record, such as a tape, wire, or the like, or it may be employed as a means for reproducing the signals which have been previously recorded on a magnetic record. In addition to the magnetic head, there is other apparatus employed in the sound translating device, such as driving motors, power transformers, or other electrical elements which produce a magnetic field during operation. The magnetic head being located adjacent to this apparatus is particularly affected by the stray alternating magnetic fields with the result that hum is introduced into the sound translating system which seriously interferes with the signals to be recorded or reproduced.

Prior art devices have attempted to solve this problem in various ways such, for example, as enclosing the magnetic head in a magnetic shield, orienting the magnetic head with respect to the stray magnetic field until the hum picked up is at a minimum, employing an auxiliary hum bucking coil to cancel undesirable signals picked up by the magnetic head, and in other ways. Irrespective of the advantages claimed for these hum minimizing arrangements, it may be said, generally, that they are either more costly than is desirable, or, as in many cases, they are impractical because they require auxiliary electrical connections, or they require a shield of more or less complicated construction, or their effectiveness is less than commercially desirable.

Accordingly, it is the primary object of my present invention to provide an improved, efficient and simplified means for preventing stray magnetic disturbances from adversely affecting the recording or reproduction of sound in magnetic sound translating devices.

Another object of my present invention is to improve the fidelity of magnetic sound reproducing devices by controlling inductive disturbances resulting from stray magnetic fields and preventing them from being fed into the sound system.

Still another object of my present invention is to provide a device which is readily adaptable to magnetic sound translating devices in use at the present time, and which may be installed with a minimum number of changes or alterations and at a minimum of cost.

A further object of my present invention is to provide a device for controlling inductive disturbances in magnetic sound translating apparatus which is simple and easy to construct and which is easily applied even by persons who may not be skilled in the art.

The foregoing objects, as well as other objects of my present invention, are achieved by disposing an elongated body of material of high magnetic permeability in close proximity to the magnetic head of a magnetic sound translating device. The body of material is adjustably mounted so that it may be oriented with respect to the magnetic head to thereby divert a major portion of the magnetic lines of flux of a stray alternating field from the magnetic head and to magnetically couple the body of material with the magnetic head in such manner that the alternating magnetic field produced by reason of the presence of the body of material in the stray field will induce an alternating voltage in the magnetic head which will oppose and effectively cancel any voltages induced directly in the magnetic head by the remaining stray magnetic lines of flux.

The novel features characteristic of my invention, as well as additional objects and advantages thereof, will be better understood from the following detailed description when read in connection with the accompanying drawing in which, Figure 1 is a top plan view of a portion of a conventional magnetic sound translating mechanism equipped with a magnetic flux controlling device in accordance with my present invention.

Figure 3:
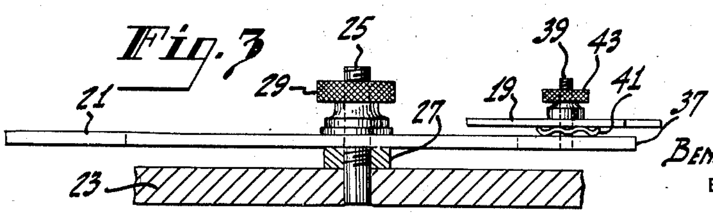

Figure 2 is an enlarged, top plan view illustrating the adjustable features of the device shown in Figure 1, and Figure 3 is a side elevational view partly in section of the device of Figure 2 showing the device mounted on a reference base forming part of the magnetic sound translating apparatus.

Referring more particularly to the drawing, wherein similar reference characters designate corresponding parts throughout, there is shown in Figure 1 a portion of a conventional magnetic sound translating device in which a magnetic record 1, such as a magnetic tape or wire, is disposed for movement in a predetermined path from a storage reel or spool (not shown) around a capstan or driving wheel 3 to a takeup reel (not shown). The magnetic record 1 is guided in its path by two or more pulleys 5. The capstan 3, which moves the magnetic record 1 in its predetermined path from the storage reel to the take-up reel, is connected to an electric motor 7 by a belt 9.

Adjacent the magnetic record 1, on the side remote from the capstan 3, there is mounted a magnetic head 11 which is in contact with the near side of the record 1. The magnetic head 11 comprises a pair of pole pieces 13 of magnetic material, each of which is provided with an induction coil or winding 15 suitable for use in recording or reproducing sound magnetically. The pole pieces 13 are preferably laminated and made of high permeability material such as soft iron, or the like, and have their ends separated an amount sufficient to provide a narrow air gap 17 between them. The ends of the pole pieces 13 contact the surface of the magnetic record 1 so that the record moves substantially tangentially across the air gap 17 when the sound translating device is in operation.

As pointed out above, there are other electrical elements employed in a magnetic sound translating device such as, for example, the electric motor 7 illustrated in Figure 1, which ordinarily produce a stray alternating magnetic field. The stray alternating magnetic fields from these elements in the region of the magnetic head 11 may induce a voltage in the inductive windings or coils 15 which usually seriously interferes with the recording or reproduction of sound by the magnetic sound translating device.

For the purpose of preventing the aforesaid stray magnetic flux from interfering with the sound system, a bar, rod, or other body of material 19 having a very high magnetic permeability, such as mu-metal, or some other material of comparable high magnetic permeability, is disposed in the stray field and adjacent to the magnetic head 11. The body of material 19 is adjustably supported on a slotted arm 21 which is pivotally supported on a reference base 23 of the translating apparatus. The slotted arm 21 is disposed in spaced, parallel relation to the reference base 23 by means of a threaded stud 25, spacing washer 27, and manually adjustable locking nut 29. As shown in Figure 2 of the drawing, the slotted arm 21 may be pivoted in either direction in a clockwise sense about the stud 25 in a plane parallel to the base 23, as indicated by the double head arrow 31. Also, the effective length of the arm 21 may be altered by providing, in the arm 21, a longitudinal slot 33 which permits the arm to be extended or withdrawn from the stud 25, as indicated by the double head arrow 35. The body of material 19 is pivotally supported on one end 37 of the slotted arm 21 by means of a threaded stud 39, lock washer 41, and locking nut 43, so that it may be pivoted on the stud 39 in a plane parallel to the reference base 23, as indicated by the double head arrow 45 in Figure 2. Thus, the body of material 19 may be adjusted in all directions in a plane intercepting the stray alternating magnetic field and may be moved toward and away from the magnetic head 11 to a favorable position with respect thereto.

When the body of material 19 is disposed in the stray magnetic field, a portion of the stray magnetic lines of flux in the region of the magnetic head 11 will be concentrated in the body of material 19 and hence diverted from the magnetic head 11. Inasmuch as only a portion of the stray magnetic flux is diverted from the magnetic head 11, the remaining portion of the stray magnetic lines of flux in the region of the magnetic head 11 may still induce a voltage in the inductive windings or coils 15. This induced voltage can be compensated for when the body of material 19 is properly oriented with respect to the magnetic head 11. The presence of the body of material 19 in the resultant stray magnetic field will set up an opposing magnetic field. This opposite field will cause a voltage to be induced in the coils 15 of opposite polarity to the voltage induced directly in the coils 15 by the remainder of the stray magnetic lines of flux. While the body of material 19 shown in the drawings is illustrated as a rectangular bar, it may be of any desired size or shape providing it is of sufficient size, preferably of the same order of magnitude as the head, to be capable of producing an opposing magnetic field of such magnitude that it will induce the required voltage necessary to oppose and effectively cancel the voltage induced directly by the stray magnetic field.

From the foregoing, it will be recognized by persons skilled in the art that I have provided a simplified and efficient device for magnetic sound translating devices which will prevent disturbances due to stray magnetic fields from interfering with the sound system of the translating device. While I have described and illustrated but a single embodiment of my present invention, it will also be recognized that various changes and modifications are possible within the spirit of my invention. Therefore, I desire that the particular form of my invention described herein shall be considered as illustrative and not as limiting.

What is claimed is:

1. In a magnetic sound translating device, the combination with a magnetic head the operation of which may be adversely affected by the presence of a stray alternating magnetic field adjacent to said magnetic head, of a body of magnetic material, means for adjustably mounting said body adjacent to and spaced from said magnetic head, said body being movable toward and away from said magnetic head in all directions in a plane intercepting said stray field, said body being orientable within said stray magnetic field so as to be responsive to divert a portion of the magnetic lines of flux in said magnetic stray field from said magnetic head and to set up an opposing alternating magnetic field which will induce an alternating voltage in said magnetic head to oppose and effectively cancel any voltages induced directly therein by the flux lines of the remainder of said stray magnetic field, said translating device having a reference base, said mounting means comprising a slotted arm supported on said reference base for longitudinal and pivotal adjustment about a point within the slot, and a substantially rectangular bar of material having a high magnetic permeability pivotally supported adjacent to one end of said slotted arm.

2. The invention as set forth in claim 1 and wherein manually adjustable locking means is provided between said body of magnetic material and said slotted arm, and between said slotted arm and said reference base.

3. In a magnetic sound recording device the combination with a magnetic head, the operation of which may be adversely affected by the presence of a stray alternating magnetic field adjacent to said magnetic head, of a body of magnetic material on the order of magnitude of said head, adjustable mounting means for positioning said body adjacent to said magnetic head whereby said body may be universally adjusted in a plane substantially parallel to but spaced from the major plane of said head, said body being orientable in said stray field to a position whereat said body will be magnetically energized by said stray field and magnetically coupled to said head in phase-opposition with respect to the effect of said stray field on said head whereby said effect on said head by said stray field is substantially neutralized.

References Cited in the file of this patent

UNITED STATES PATENTS

| Number | Name | Date |
|---|---|---|
| 2,351,008 | Camras | June 13, 1944 |
| 2,483,123 | Clapp | Sept. 27, 1949 |

FOREIGN PATENTS

| Number | Country | Date |
|---|---|---|
| 457,282 | Germany | Mar. 13, 1928 |